April 22, 1941.　　　　G. Z. MINTON ET AL　　　　2,239,535
APPARATUS FOR MAKING TEMPERED GLASS
Filed March 25, 1938　　　2 Sheets-Sheet 1
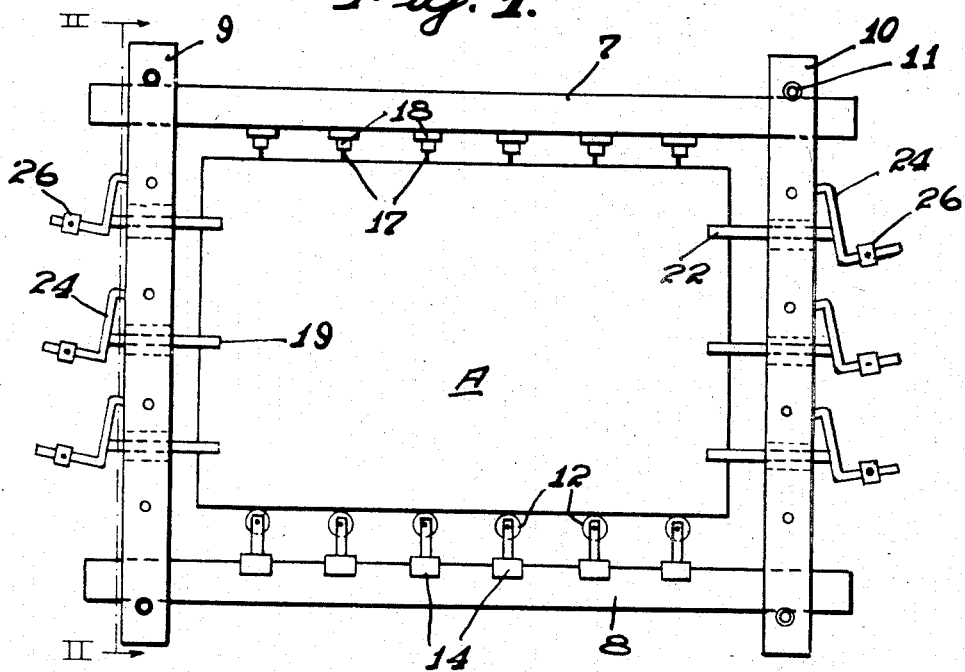
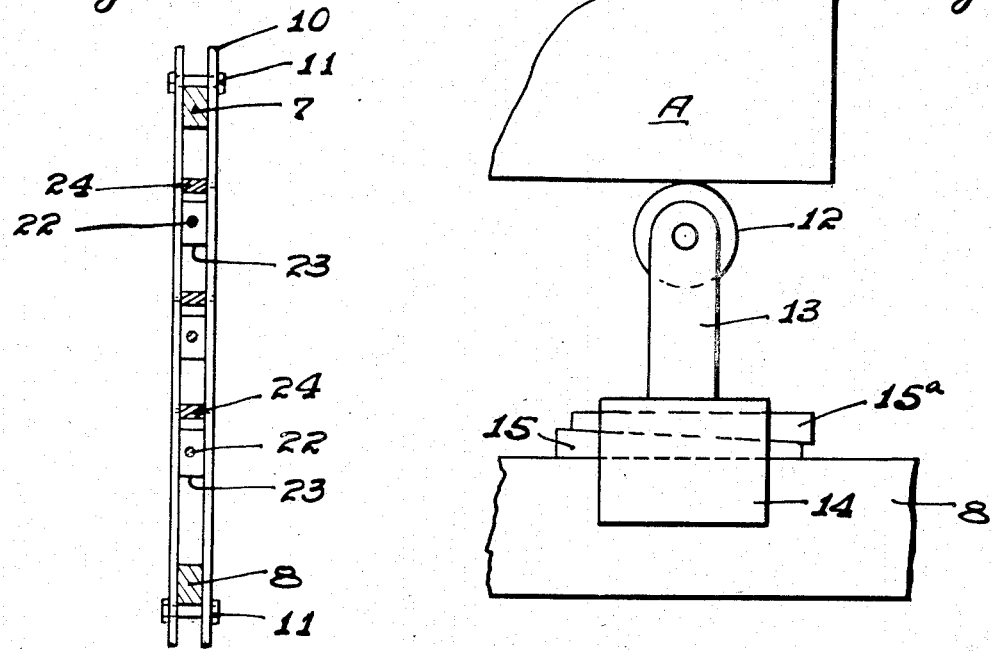
INVENTORS
G. Z. MINTON AND
LLOYD V. BLACK
BY Bradley & Bee
ATTORNEYS.

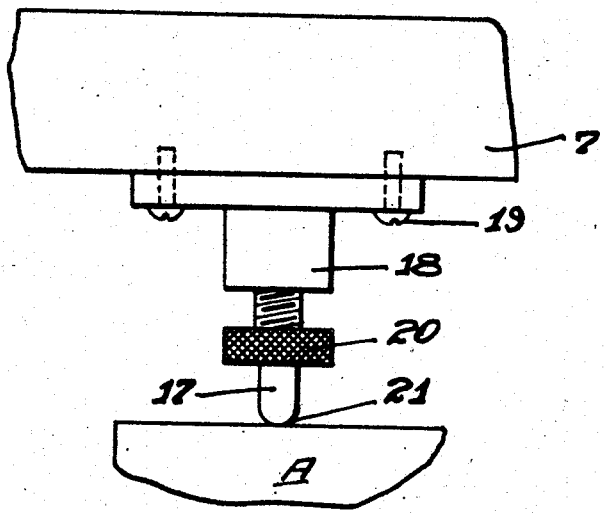
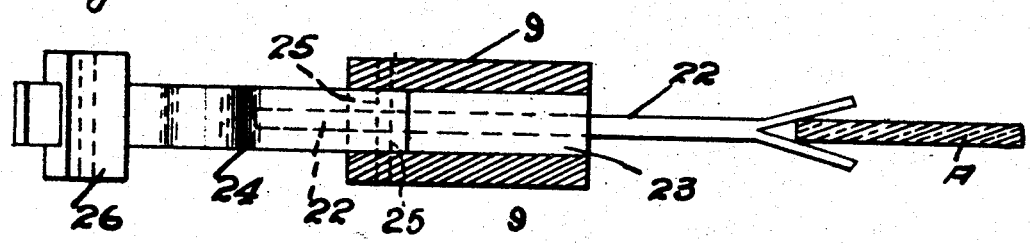
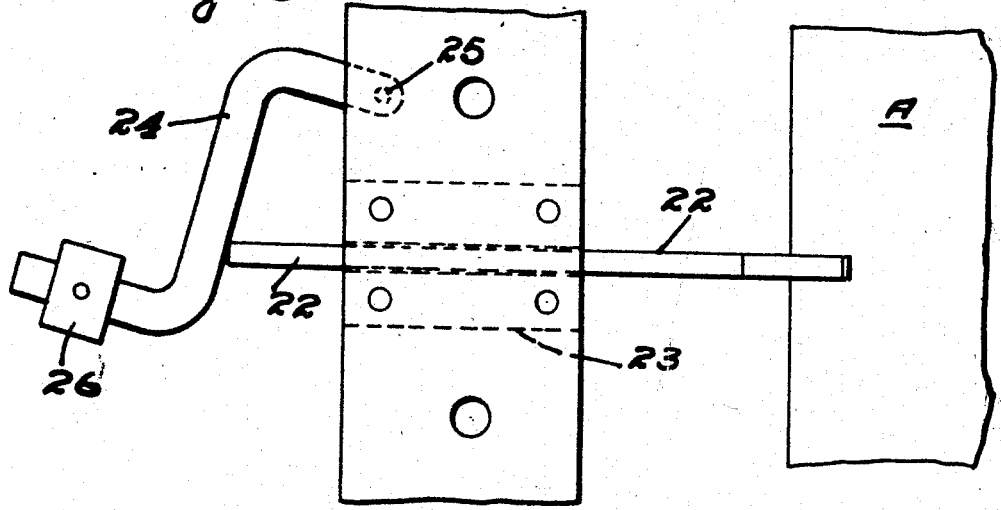

Patented Apr. 22, 1941

2,239,535

UNITED STATES PATENT OFFICE 2,239,535

APPARATUS FOR MAKING TEMPERED GLASS

Gerald Z. Minton and Lloyd V. Black, Tarentum, Pa., assignors to Pittsburgh Plate Glass Company, a corporation of Pennsylvania Application March 25, 1938, Serial No. 198,058

5 Claims. (Cl. 49—14)

The invention relates to apparatus for making case hardened or tempered glass, and particularly to the means for supporting the glass during the heating and chilling steps. The apparatus is particularly adapted to the support of heavy glass and involves improvements over the apparatus shown in the patent to L. V. Black, No. 1,970,730 dated August 21, 1934. The primary objects of the invention are to provide improved supporting means for the glass plates which will not mar them or cause breakage and which insure an even strain distribution along the four edges of the plates. One embodiment of the invention is shown in the accompanying drawings, wherein:

Figure 1 is a front elevation of the apparatus for supporting glass plates. Fig. 2 is a vertical section taken substantially along the line II—II of Fig. 1. Fig. 3 is an enlarged detail showing one of the bottom supporting members for the plate. Fig. 4 is a detail view showing one of the devices for engaging the top edge of the plate. Figs. 5 and 6 are detail views showing one of the devices used for engaging the side edges of the plate, Fig. 5 being a sectional view and Fig. 6 a side elevation.

Referring to the drawings, 7 and 8 are the top and bottom bars of the frame, in which the glass plate A is supported, and 9 and 10 are pairs of side bars. The side bars are each made up of two plates spaced apart, as indicated in Fig. 2, for receiving the ends of the bars 7 and 8 between them. Upper and lower bolts 11 are provided at the corners of the frame for clamping the side bars against the ends of the bars 7 and 8, a plurality of bolt holes being provided so that the top bar may be adjusted downwardly to suit glass plates of different sizes. This clamping method also permits the bars 9 and 10 to be adjusted toward and from each other. The clamping action of the upper and lower bolts as referred to above is, of course, a matter of degree and it is apparent that in order to provide for proper expansion of the glass sheet in response to changes in temperature, sufficient looseness of the upper bolts must be permitted to prevent buckling of the glass, while at the same time, to insure proper action of the rounded extremities 20 of the adjustable pins 17 in performing their function of maintaining the upper edge of the glass in a substantially straight line. These upper bolts 11 are not clamped sufficiently tightly to obstruct the upward movement of the upper bar 7 in responding to the mode of operation referred to in the preceding paragraphs. It is equally apparent that the lower bolts 11 can be clamped as tightly as desired commensurate with the maintenance of the lower bar 8 and vertical members 9, 10 in properly assembled relation.

In order to support the bottom edge of the plate, a series of rolls 12 are provided, each mounted in a bracket 13 having a U-shaped portion 14 at its lower end for fitting over the edge of the bar 8. A pair of wedges 15 and 15a are provided for giving the rolls a vertical adjustment, so that they may be properly aligned in such manner that their upper peripheries contact equally along the line defined by the lower edge of the glass plate A supported thereby. This method of supporting the lower edge of the plate A provides for horizontal movement of such edge due to the expansion and contraction of the plate in the heating and chilling operations. As a result any condition of strain in the lower edge is avoided.

The upper edge of the plate is engaged by a series of pins 17 carried in brackets 18 secured to the top bar 7 by means of the screws 19. The pins are threaded into the brackets 18 and provided with knurled discs 20 to permit of the ready adjustment of the pins up and down for the purpose of aligning their lower extremities with the upper edge of the glass plate A which they contact. The ends of the pins are rounded, as indicated at 21, and engage the edge of the glass plate intermediate the faces of the sheet. When the plate is placed in the frame, these pins are adjusted downward so that they lightly engage the edge of the plate. The purpose of these pins is to prevent warping of the upper edge of the plate during the heating and chilling operations, and they accomplish this function without introducing strain into the edge, the relatively light engagement of the rounded edge of the pins permitting a slight movement longitudinally of the plate edge due to expansion and contraction.

The side edges of the plate are engaged by the rods 22 which are mounted for free sliding movement through blocks 23 carried between the plates of the bars 9 and 10. These blocks serve also as spacers between the vertical pairs of frame members 9 and 10. The ends of these rods are forked, as indicated in Fig. 5, so that they fit around the side edges of the plate and prevent any tilting movement of the plate around its bottom edges. Each rod is yieldingly pressed toward the edge of the plate by means of a lever 24 pivoted at 25 and provided with a weight 26 which is adjustable so that the pressure applied to the rod may be varied to meet requirements. This yielding engagement of the end edges of the plate permits of endwise movement due to expansion and contraction, but the pressure involved is so slight, that no condition of strain is produced in the edge of the sheet.

It will be apparent that the plate supporting means as described avoid any tendency to mar the faces of the glass plate and that they permit free expansion and contraction of the plate in all directions, so that no condition of edge strain is produced. The contact members are all of relatively light material so that they produce only a slight modification of temperature conditions at the points at which they engage the glass plate. The contact members are all preferably made of heat and corrosion resisting materials, such as stainless steel. It will be understood that in handling the frame, it is supported upon a trolley or other suitable transfer means so that it may be carried first through the heating furnace, where the glass is brought to a temperature approximating the softening point, and then carried through a cooling area where the sheet is chilled rapidly, preferably by means of air blasts applied to the faces of the plate in a manner well known in the art.

What we claim is:

1. In an apparatus for supporting a rectangular glass plate in freely expansible relation in connection with the case hardening thereof, an upright frame including top, bottom and side bars defining a substantially vertical plane in which the glass plate is adapted to be supported; a series of rotatable members mounted in spaced relation on the bottom bar in the plane in which the glass plate is to be supported, said members having upper extremities aligned horizontally for uniformly supporting the glass plate along its bottom edge in freely horizontally expansible relation of the latter, and means carried by the side bars and engaging the side edges of the plate to hold the latter in a vertical position.

2. In an apparatus for supporting a rectangular glass plate in freely expansible relation in connection with the case hardening thereof, an upright frame including top, bottom and side bars defining a substantially vertical plane in which the glass plate is adapted to be supported; a series of rotatable members mounted in spaced relation on the bottom bar in the plane in which the glass plate is to be supported, said members having upper extremities aligned horizontally for uniformly supporting the glass plate along its bottom edge in freely horizontally expansible relation of the latter, and means associated with each of said members and operable to adjust the latter vertically and to insure uniform distribution thereon of the weight of the glass along its lower edge.

3. In an apparatus for supporting a rectangular glass plate in freely expansible relation in connection with the case hardening thereof, an upright frame including a bottom bar, side bars, and a top bar movable vertically in the upper portions of the side bars, all defining a substantially vertical plane in which the glass plate is adapted to be supported; a series of rotatable members mounted in spaced relation on the bottom bar in the plane in which the glass plate is to be supported, said members having upper extremities aligned horizontally for uniformly supporting the glass plate along its bottom edge in freely horizontally expansible relation of the latter, a series of pins carried on the top bar and each pin having associated therewith adjustable means operable to adjust said pins vertically into uniform contact with the upper edge of the glass plate, and means carried by the side bars and engaging the side edges of the plate to hold the latter in a vertical position.

4. In an apparatus for supporting a rectangular glass plate in freely expansible relation in connection with the case hardening thereof, an upright frame including top, bottom and side bars defining a substantially vertical plane in which the glass plate is adapted to be supported; a series of rotatable members mounted in spaced relation on the bottom bar in the plane in which the glass plate is to be supported, said members having upper extremities aligned horizontally for uniformly supporting the glass plate along its bottom edge in freely horizontally expansible relation of the latter, rods having forked inner ends slidably mounted horizontally through the side bars for holding the vertical edges of the glass against lateral displacement, and weighted lever arms pivoted to the side bars yieldably engaging the outer ends of the rods for yieldably pressing the latter into engagement with the edges of the glass plate.

5. In an apparatus for supporting a rectangular glass plate in freely expansible relation in connection with the case hardening thereof, an upright frame including top, bottom and side bars defining a substantially vertical plane in which the glass plate is adapted to be supported; a series of rotatable members mounted in spaced relation on the bottom bar in the plane in which the glass plate is to be supported, said members having upper extremities aligned horizontally for uniformly supporting the glass plate along its bottom edge in freely horizontally expansible relation of the latter, a series of pins screw-threaded vertically into the top bar and having their lower ends rounded for engagement with the upper edge of the glass plate, and means carried by the side bars and engaging the side edges of the plate to hold the latter in a vertical position.

GERALD Z. MINTON.
LLOYD V. BLACK.